United States Patent [19]

Benfield

[11] Patent Number: 4,476,855

[45] Date of Patent: Oct. 16, 1984

[54] SOLAR HEATING DEVICE

[75] Inventor: Sherwood G. Benfield, Matthews, N.C.

[73] Assignee: Unified Technologies, Inc., Charlotte, N.C.

[21] Appl. No.: 368,902

[22] Filed: Apr. 15, 1982

[51] Int. Cl.³ .............................................. F24J 3/02
[52] U.S. Cl. ..................................... 126/426; 126/450
[58] Field of Search ................. 126/416, 426, 450; 4/498

[56] References Cited

U.S. PATENT DOCUMENTS

| | | | |
|---|---|---|---|
| 2,405,877 | 8/1946 | Delano | 126/426 X |
| 3,593,757 | 7/1971 | Haynes | 4/498 X |
| 3,868,945 | 3/1975 | Konopka et al. | 126/416 |
| 4,036,209 | 7/1977 | Press | 126/426 X |
| 4,038,967 | 8/1977 | Stout et al. | 126/444 |
| 4,227,514 | 10/1980 | Spitzer | 126/445 X |
| 4,228,790 | 10/1980 | Davidson et al. | 126/426 X |

Primary Examiner—Larry Jones
Attorney, Agent, or Firm—Daniel E. McConnell

[57] ABSTRACT

A solar heating device wherein a flexible-walled container of reinforced thermoplastic material serves as a solar fluid heater. The flexible-walled container is formed of fabric reinforced sheets of fluoroplastic material, such as polytetrafluoroethylene (Teflon) fusibly bonded together to provide fluid flow passages therebetween. Fluoroplastic materials are unaffected by outdoor weathering and have almost complete chemical inertness and are the slipperiest of all solids to provide low resistance to flow of fluid through the passages.

23 Claims, 11 Drawing Figures

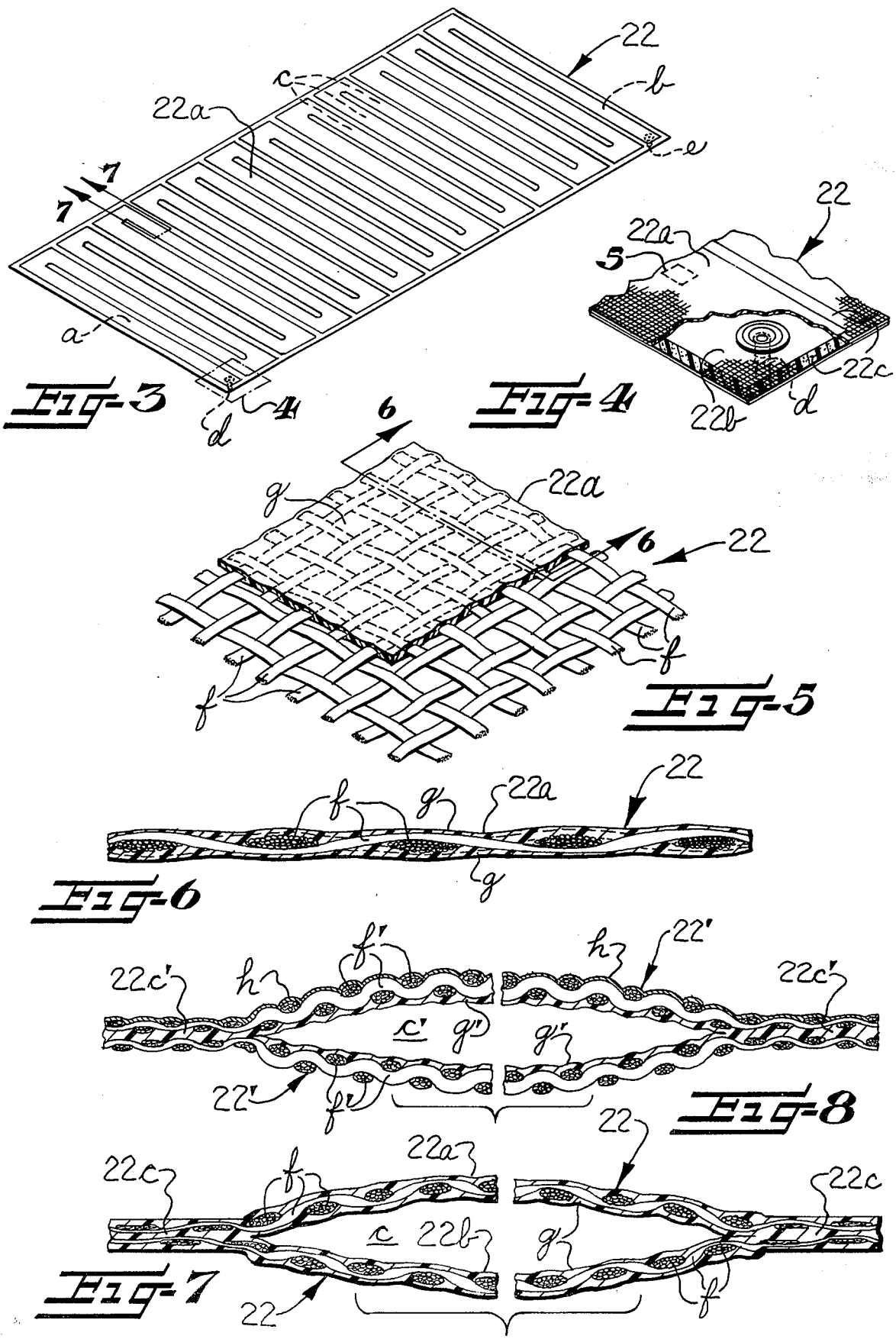

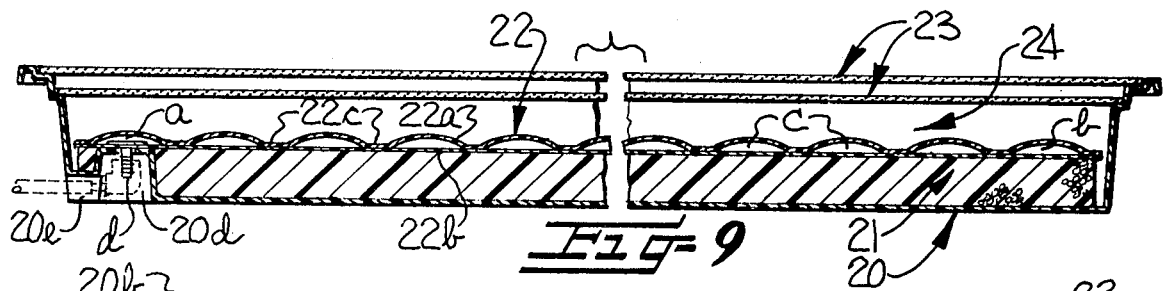
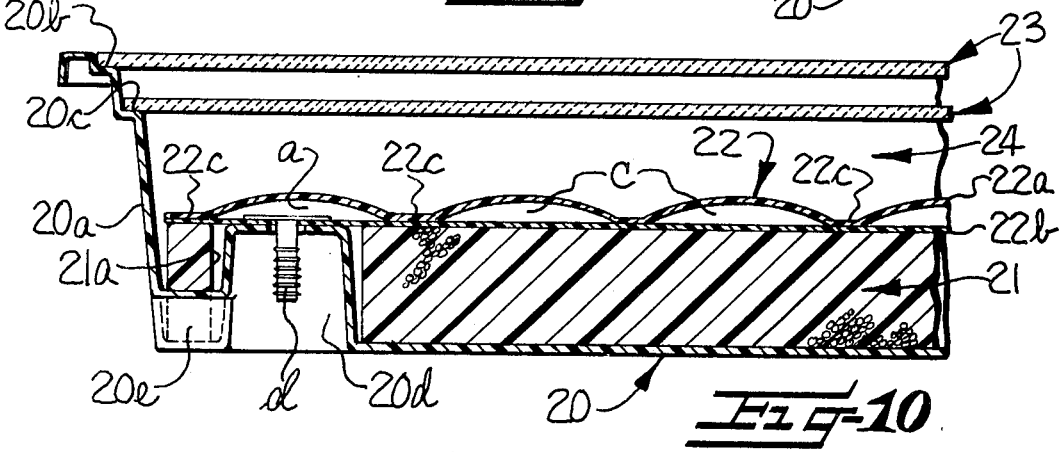
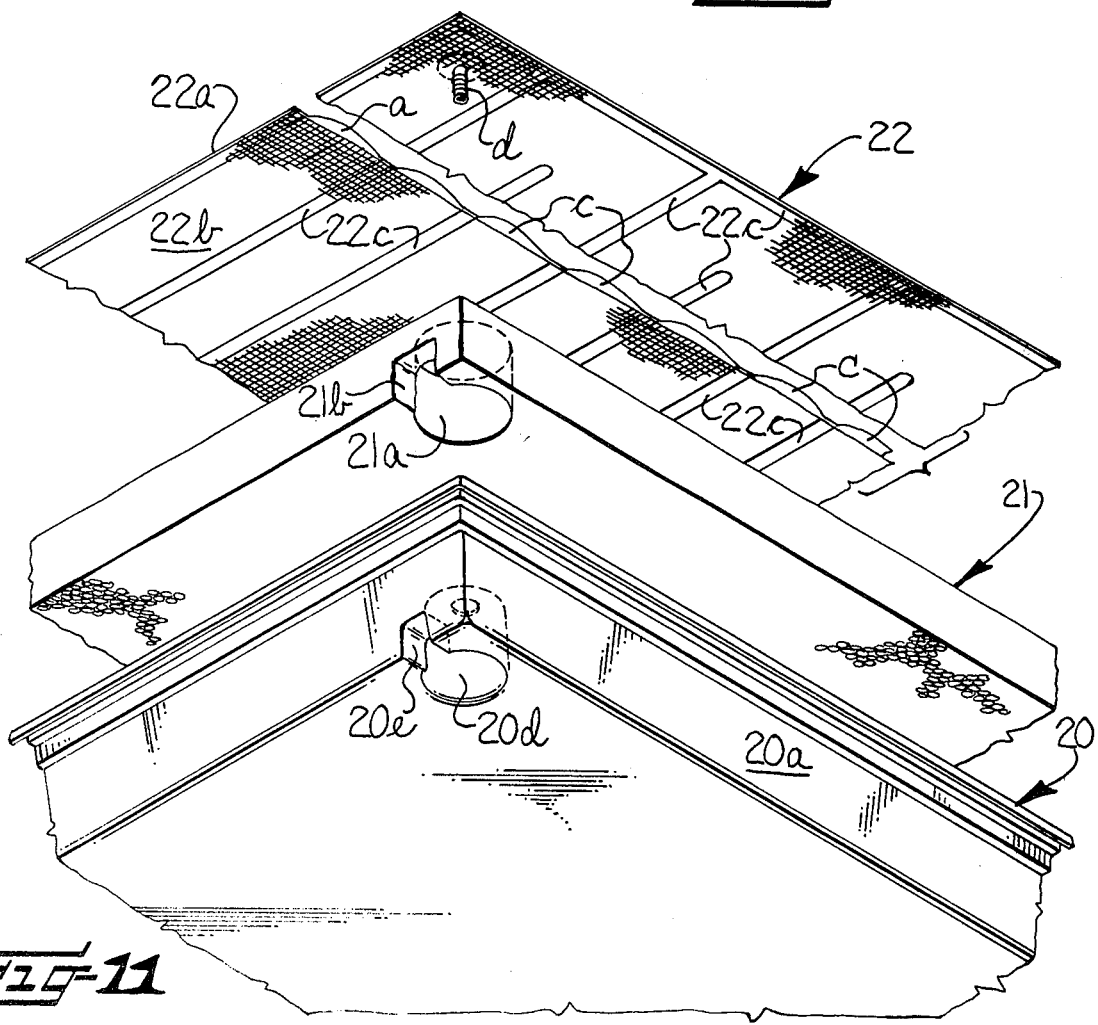

SOLAR HEATING DEVICE

This invention relates to solar heating devices and more particularly to a solar heating device wherein a flexible-walled container of reinforced thermoplastic material serves as a solar fluid heater.

All solar heating devices that are known to be commercially available have a solar fluid heater formed of rigid pipes. Most commonly, the pipes are formed of copper to reduce corrosion and to better withstand various weather conditions in environments where solar heating devices are utilized. Under certain environmental conditions, rigid plastic pipes have been utilized in lieu of copper. However, it is recognized that such plastic pipes are not suitable in areas where there is intense sunlight and attendant high heat generated within the solar heating system. In this regard, it is known that with a transparent cover overlying a solar fluid heater that the trapped heat between the cover and the solar fluid heater can be so high that the plastic pipes tend to soften and lose their shape and cause leakage of fluid from the system.

With the foregoing in mind, it is the primary object of this invention to provide a solar fluid heater for use with a variety of different types of solar heating devices and which is constructed of extremely lightweight reinforced thermoplastic material and yet exhibits very high tensile strength for readily being utilized in any environment wherein prior art devices have been utilized and irrespective of how extreme the temperature conditions might be.

It is a further object of this invention to provide a solar fluid heater wherein the cost of constructing the same including the materials thereof are only a small fraction of those solar fluid heaters formed of rigid piping material. Thus, it is contemplated that this invention would be an impetus for more widespread use of solar heating devices.

It is a more specific object of this invention to provide a solar fluid heater of flexible-walled construction and wherein the fluid heater is formed of fabric reinforced sheets of fluoroplastic material such as polytetrafluoroethylene (Teflon) fusibly bonded together to provide fluid flow passages therebetween. Fluoroplastic materials are known to be unaffected by outdoor weathering and have almost complete chemical inertness. Further, such fluoroplastic materials are known to be the slipperiest of all solids which is desirable in a solar fluid heater to provide low resistance to flow of fluid through the passages thereof.

It is a further more specific object of this invention to provide a solar heating device having an open top receptacle, substantially rigid thermal insulating means positioned in the bottom of the receptacle, a flexible-walled container serving as a solar fluid heater and positioned to overlie and rest on the thermal insulation means. The walls of the fluid heater are formed of fabric reinforced sheets of fluoroplastic material fusibly bonded together to define fluid flow passageways, and a transparent cover is positioned to overlie the fluid flow heater and serve as a top enclosure cover for the heating device and to also define a solar heating chamber overlying the solar fluid heater.

Some of the features of the invention having been described, others will appear as the description proceeds when taken in connection with the accompanying drawings, in which:

FIG. 3 is a perspective view of a flexible-walled container removed from the open top receptacle of the solar heating device;

FIG. 4 is an enlarged fragmentary view of one corner portion of the flexible-walled container of the area identified by the numeral 4 in FIG. 3;

FIG. 5 is a greatly enlarged fragmentary view of the flexible material forming each wall of the container taken of the area identified by the numeral 5 of FIG. 4;

FIG. 6 is a further enlarged fragmentary sectional view through one embodiment of the sheet of thermoplastic material of which a flexible wall of the container may be formed, and being taken substantially along the line 6—6 in FIG. 5;

FIG. 7 is an enlarged fragmentary sectional view, taken along line 7—7 in FIG. 3, through the flexible-walled container and illustrating one of the fluid flow passages or channels defined therein by fusibly bonding the walls together;

FIG. 8 is a sectional view similar to FIG. 7, but showing a modified embodiment of the construction of the sheet of thermoplastic material of which flexible walls of the container may be formed;

FIG. 9 is an enlarged longitudinal vertical sectional view through the solar heating device, with portions broken away, taken substantially along the line 9—9 in FIG. 1;

FIG. 10 is a further enlarged fragmentary view of the left-hand end portion of FIG. 9; and FIG. 11 is an enlarged, partially exploded view similar to the left-hand portion of FIG. 2, but illustrating how the fluid inlet for the container is arranged relative to other components of the solar heating device.

Figure 1:
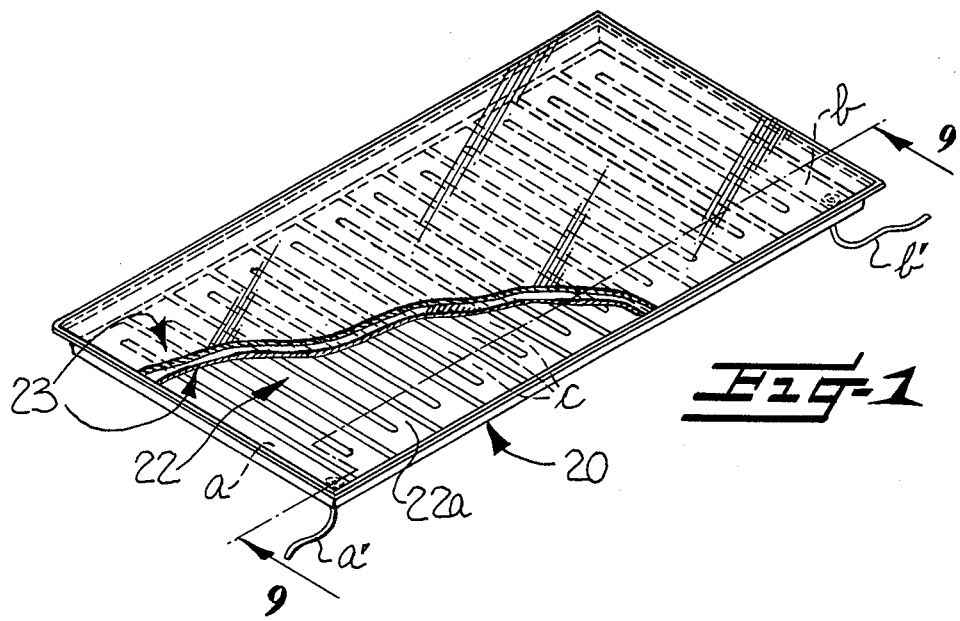
FIG. 1 is a perspective view of a preferred embodiment of the solar heating device of the present invention.

Referring more specifically to the drawings, the solar heating device of the present invention comprises an open top receptacle or tray 20 (FIGS. 1, 2, 9, 10 and 11) preferably formed of relatively thin material of plastic or aluminum and which may be generally rectangular in plan, and on the bottom of which a thermal insulating means 21, such as a panel or layer of relatively rigid expanded foam, is positioned. A solar heater in the form of a flexible-walled container or envelope for a fluid, overlies and rests upon the thermal insulating means 21 and is provided with an inlet a and an outlet b for a fluid to be solar heated to flow into and out of the flexible-walled container 22.

As will be later described more in detail, the container 22 is constructed to provide means defining fluid flow passages or channels c therein communicatively connecting the inlet a and the outlet b for the flow therethrough of a fluid to be solar heated. Accordingly, respective nipple means or couplings d, e are connected to the inlet a and outlet b and extend downwardly through the thermal insulating means 21 and the receptacle 20 so as to be readily accessible from the exterior of the receptacle 20 for facilitating the connection thereto of tubing a', b' for fluid flow therethrough.

Transparent cover means 23 is spaced above and overlies the flexible-walled container 22 so as to define, with side and end walls 20a of the receptacle 20, a solar heating chamber 24 (FIGS. 9 and 10) overlying the flexible-walled container 22. In this regard, it is apparent that the upper wall of container 22 defines the bottom of the solar heating chamber 24. The transparent cover means 23 may take the form of one or more panels of transparent material, such as glass or plastic, through which the rays of the sun will readily penetrate for heating the chamber 24, the container 22, and the fluid flowing in the passages of the container.

As best illustrated in FIGS. 9 and 10, the transparent cover means 23 there shown comprises a pair of superposed, planar, upper and lower transparent panels 23a, 23b which may rest upon respective peripheral shoulder means 20b, 20c formed in or otherwise provided on the upper portions of the side and end walls 20a of receptacle 20. The shoulder means 20b, 20c may be arranged in a stepwise manner so as to facilitate installation and removal of the panels 23a, 23b with respect to the receptacle 20. The shoulder means 20b, 20c are vertically spaced apart so as to maintain the transparent panels 23a, 23b in spaced relationship for defining a shallow thermal insulating air space therebetween to minimize loss of solar heat from chamber 24 through panels 23a, 23b to the ambient atmosphere.

Figure 2:
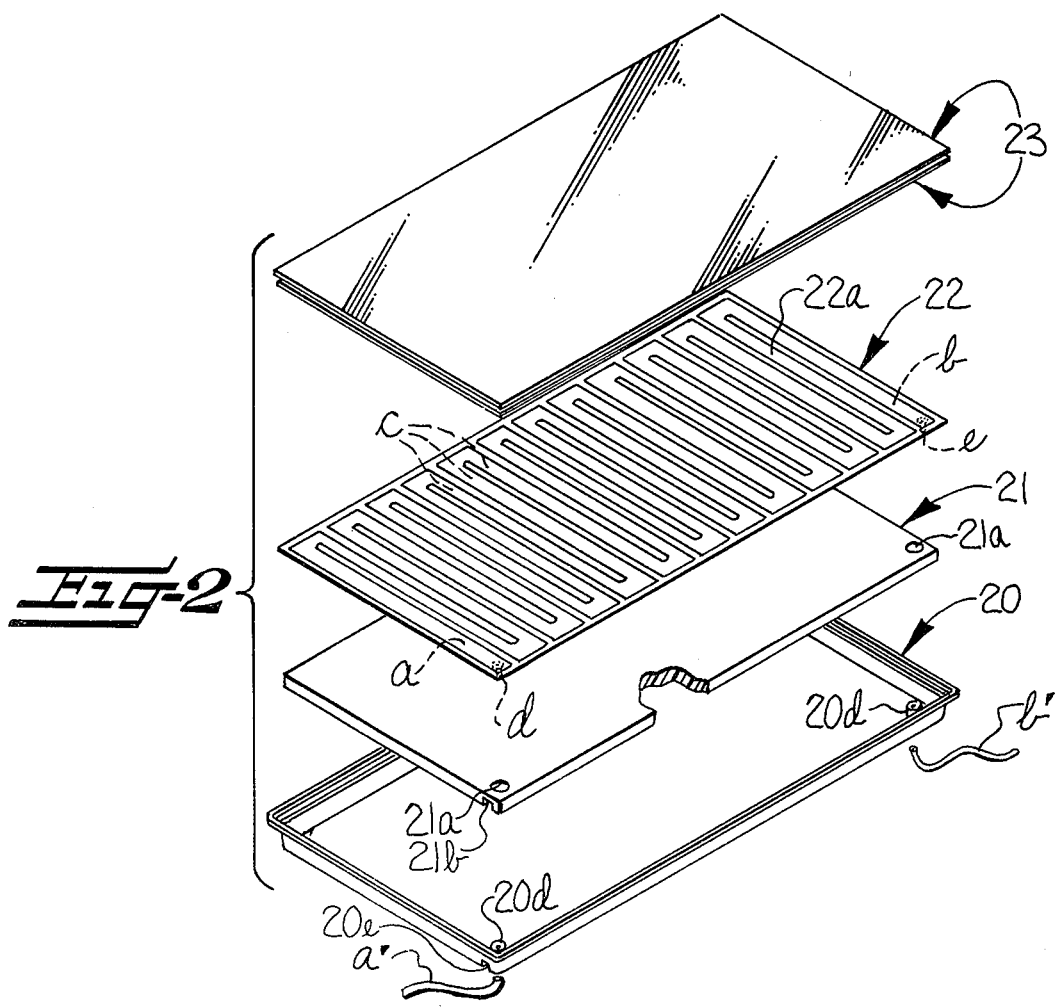
FIG. 2 is a partially exploded perspective view of the solar heating device.

The upper and lower walls of the flexible-walled container 22 are designated at 22a, 22b and are formed of respective relatively thin sheets of reinforced thermoplastic material joined together, preferably by being fusibly bonded as at 22c, to define the aforementioned fluid flow passages c therebetween. As shown in FIGS. 1-3, the container walls or reinforced sheets 22a, 22b of thermoplastic material are fusibly bonded together along their peripheral edge portions and along a series of substantially parallel and relatively narrow transverse lines preferably arranged so that the fluid flow passages c defined thereby collectively define a sinuous fluid flow passageway extending from end to end of the flexible-walled container 22. Fusible bonding may be accomplished, for example, by applying heat and pressure. The characteristics of the sheets or walls 22a, 22b as described hereinafter contribute important strength to such bonding.

Desirably, the thermoplastic material of which the opposing sheets or walls 22a, 22b are made is a fluoroplastic material, preferably polytetrafluoroethylene (Teflon), or polychlortrifluoroethylene, and which maintains flexibility over a temperature range far broader than other materials, is substantially unaffected by exposure to outside weather, and has almost complete chemical inertness. Further, fluoroplastics are the slipperiest of all solids to reduce the coefficient of friction of the flow of fluid through the fluid flow passages c. Also, it is desirable that the reinforced flexible sheets 22a, 22b of the container 22 be thin, i.e., within the range of about 3 mils to 6 mils thick, and no more than about 20 mils thick. It has been determined that a number of very important advantages are obtained by using thin sheets within the 3 mils to 6 mils thickness. For example, the flexibility of the sheets is such as to facilitate handling for rolling up the sheets into a compact package for shipment. Further, the thin sheets permit higher heat transfer therethrough from the fluid flowing within the channels of the container to thus enhance the overall efficiency of the solar device. Additional advantages have appeared in the manufacturing of the container in that less costly sheets of material are involved and less time is taken to effect fusion bonding of the sheets for forming the container since a quicker heat transfer is effected through thinner material.

In order to lend strength and dimensional stability to each sheet 22a, 22b of thermoplastic material while in use, and to also aid in maintaining the integrity and stability of the sheet material so as to prevent "creep" during manufacture of the flexible-walled containers 22 by the use of production machinery and during which the thermoplastic material is taut or placed under substantial tension and compression during bonding, in accordance with this invention each sheet 22a, 22b comprises a reinforcing fabric which is intimately bonded to or embedded in the thermoplastic material. The reinforced sheet may be formed by the reinforcing fabric being coated with the thermoplastic material as by well known vaporization/condensation techniques for fluoroplastic types of thermoplastic. By way of illustration, portions of a flexible wall of container 22 are shown in FIGS. 5 and 6 wherein the reinforcing fabric is indicated at f and the thermoplastic material is indicated at g. There it will be observed that the reinforcing fabric f comprises a sheet of woven fibers or strands, preferably glass or aramid fibers (Kevlar) for high tensile strength, which are embedded in or coated with the thermoplastic material g. As a suitable example, it has been determined that a 3 mil thick glass fiber reinforced fluoroplastic sheet of one inch width had a tensile strength of 70 pounds.

As earlier indicated, there are a number of reasons including economy, ease of handling, and flexibility for having the reinforced sheets 22a, 22b formed of thin material preferably within the range of 3 to 6 mils in thickness. With this thin sheet material it is important that zero moisture absorption be present to provide a fluid tight non-leaking container. Tests have indicated that more than 40% of the overall weight of such sheets, and preferably about 60% of the overall weight of the sheets should be thermoplastic material. In this regard tests have indicated that reinforced sheets of 3 mils thickness having 40% thermoplastic material would not work to provide a satisfactory container since there was insufficient thermoplastic material to effect the fusible bond and to provide zero water absorption in the reinforced sheet material.

The woven reinforcing fabric f has been described above as being embedded within the thermoplastic material g with reference to FIGS. 5 and 6 and as further illustrated in FIG. 7. Since it is contemplated that the reinforcing fabric need not be embedded in the thermoplastic material, in the modification of FIG. 8 it will be observed that the thermoplastic material g' is bonded to one side of the fabric f'. As illustrated, the thermoplastic material g' is bonded to the inner side of the reinforcing fabric f' with the reinforcing fabric f' thus being exposed exteriorly of the container 22'. Desirably a heat absorbing coating h is applied to the exposed reinforcing fabric to increase the heat absorption from the sunlight. In other respects, the modified form of the reinforced fabric in FIG. 8 may be of the same construction as that shown in FIGS. 5, 6 and 8. Accordingly, a further description of the reinforced sheet of material shown in FIG. 7 is deemed unnecessary.

As hereinbefore described, nipple means d, e are connected to the inlet a and outlet b for the flow of fluid into, through and out of the passages c in the container 22. To this end, each nipple means d, e is positioned adjacent a respective corner of the container defining the respective inlet a and outlet b. Since both nipple means d, e may be mounted in essentially the same manner, only the arrangement at the nipple means d will be described in detail.

Accordingly, as shown in FIGS. 4, 9, 10 and 11, the stem or shank of nipple means d penetrates the lower flexible wall 22b of container 22 and has a flange h on its upper end which is fusibly bonded in sealing engagement with the lower flexible wall 22b of the container 22. To shieldingly protect and to anchor the nipple means d, the bottom of receptacle 20 has an inverted substantially cup-shaped portion projecting upwardly therefrom and terminating substantially flush with the upper surface of the thermal insulation means 21 upon which rests the bottom wall 22b of the container 22.

The insulation means 21 has suitable openings 21a therethrough for accommodating the respective inverted cup-shaped portions 20d on the bottom of the receptacle 20. Thus, it can be seen in FIG. 10 that the nipple means d communicates with the interior of the flexible-walled container 22 at the fluid inlet a and extends downwardly through the thermal insulating means 21 so as to be readily accessible from the exterior of the receptacle 20. Also, the receptacle 20 and the insulating means 21 have cooperating side passages 20e, 21b (FIG. 11) opening to the adjacent side or end wall 20a of the receptacle 20 and communicating with the respective inverted cup-shaped portion 20d and opening 21a, respectively, so that the tubing a', b' in each instance, may extend laterally outwardly through the latter side passages without projecting below the bottom of the receptacle 20. It is apparent that the side passage 21b in the insulation accommodates the side passage 20e of the receptacle therethrough when the thermal insulation means 21 is positioned upon the bottom of the receptacle 20.

In order to connect the various components together, upper and lower surfaces of the thermal insulation means 21 are provided with adhesive. The adhesive on the lower surface of the insulation means connects the same to the receptacle 20, while the adhesive on the upper surface connects the insulation means to the bottom wall of the flexible-walled container 22. Normally the adhesive for connecting the thermal insulation means to the bottom wall of the flexible-walled container 22 will differ from the adhesive used for connecting the thermal insulation means to the receptacle. In this regard, and as well recognized by those versed in fluoroplastic materials, it is extremely difficult to effect an adhesive bond thereto. Typically, and as is contemplated by this invention, the reinforced fluoroplastic sheet forming the bottom wall of the container 22 will be etched or chemically treated by known techniques.

If deemed desirable, carbon black, black chrome or some other darkening material may be incorporated in either the upper or lower, or both, of the fluoroplastic sheets to increase the absorption of heat. If the reinforcing fabric is formed of aramid fibers, for example, instead of glass fibers, then a darkening agent should be added to avoid the breakdown of the aramid fibers from the sunlight.

In the drawings and specification, there have been set forth preferred embodiments of the invention, and although specific terms are employed, they are used in a generic and descriptive sense only and not for purposes of limitation, the scope of the invention being defined in the claims.

That which is claimed is:

1. A solar heating device comprising an open top thin-walled receptacle, thermal insulating means formed of a sheet of expanded foam positioned in the bottom of said receptacle, said foam sheet being relatively rigid and adhesively secured to the bottom of said thin-walled receptacle to lend rigidity and strength thereto, a flexible-walled container for a fluid overlying and resting on said thermal insulation means, the walls of said container comprising opposing fusibly bonded together sheets of fabric reinforced fluoroplastic material impermeable to vapor, said flexible-walled container having an inlet and an outlet for a fluid to be heated to flow into and out of said container, said container also having means defining fluid flow passages communicatively connecting said inlet and outlet for the flow therethrough of the fluid to be solar heated, and transparent cover means on said receptacle and serving as a top enclosure cover therefor, said transparent cover means overlying said flexible-walled container and being in spaced relation thereto and serving to define a solar heating chamber overlying said flexible-walled container.

2. A solar heating device according to claim 1 including respective nipple means connected to said inlet and outlet and extending downwardly through said thermal insulating means and said receptacle and being accessible from the exterior of said receptacle for facilitating the connection of tubing for fluid flow therethrough.

3. A solar heating device comprising an open top receptacle, thermal insulating means positioned in the bottom of said receptacle, a flexible-walled container for a fluid overlying and resting on said thermal insulating means, the walls of said container comprising opposing interconnected sheets of reinforced fluoroplastic material impermeable to vapor and substantially unaffected by outdoor weathering, said sheets being fusibly bonded together to define a fluid flow passageway through the container and with an inlet and an outlet for a fluid to be heated to flow into and out of said container, said sheets having a reinforcing fabric intimately bonded to each sheet to lend strength and dimensional stability thereto, and transparent cover means on said receptacle and serving as a top enclosure cover therefor, said transparent cover means overlying said flexible-walled container and being in spaced relation thereto and serving to define a solar heating chamber overlying said flexible-walled container.

4. A solar heating device according to claim 1 wherein each of the sheets of fluoroplastic material with a reinforcing fabric bonded thereto has a thickness in the range of 3 mils to 20 mils.

5. A solar heating device according to claim 4 wherein each of the sheets of fluoroplastic material with a reinforcing fabric bonded thereto has a thickness within the range of 3 mils to 6 mils and wherein the fluoroplastic material comprises about 60% of the weight thereof.

6. A solar heating device according to claim 5 wherein the reinforcing fabric bonded to each of said sheets is a woven fabric, and wherein each of said sheets with said woven fabric has a thickness of 3 mils and weighs about 4 ounces per square yard.

7. A solar heating device according to claim 1 wherein said opposing sheets of reinforced thermoplastic material are composed of woven glass fibers coated with polytetrafluoroethylene, and wherein the coated opposing sheets are fusibly bonded together to define said fluid flow passages therethrough.

8. A solar heating device according to claim 7 wherein said coated sheets of woven glass fibers have a thickness within the range of 3 mils to 20 mils and wherein the polytetrafluoroethylene coating comprises more than 40% of the weight of the sheets.

9. A solar heating device according to claim 8 wherein the polytetrafluoroethylene coating comprises about 60% of the weight of the sheets.

10. A solar heating device according to claim 7 wherein said coated sheets of woven glass fibers have a thickness within the range of 3 mils to 6 mils and wherein the polytetrafluoroethylene coating comprises about 60% of the weight of the sheets.

11. A solar heating device according to claim 1 including a coating of heat absorbing material on the upper surface of the sheet of reinforced thermoplastic material defining the upper wall of the container and serving for enhancing the transfer of solar heat to the upper wall of the container and in turn to a fluid flowing through the container.

12. A solar fluid heater comprising a flexible-walled container with the walls thereof comprising opposing sheets of fluoroplastic material impermeable to vapor and bonded together so as to define a fluid flow passageway through the container, said flexible-walled container having an inlet and an outlet for a fluid to be heated to flow into and out of said container, and a reinforcing fabric intimately bonded to each sheet of fluoroplastic material to lend strength and dimensional stability thereto.

13. A solar fluid heater according to claim 12 wherein said fluoroplastic material is polytetrafluoroethylene and said reinforcing fabric is formed of fibers selected from the group consisting of glass and aramid fibers.

14. A solar fluid heater according to claim 12 or 13 wherein each of the sheets of fluoroplastic material with a reinforcing fabric bonded thereto has a thickness in the range of 3 mils to 20 mils.

15. A solar fluid heater according to any one of claims 12 or 13 wherein each of the sheets of fluoroplastic material with a reinforcing fabric bonded thereto has a thickness within the range of 3 mils to 6 mils and wherein the fluoroplastic material comprises about 60% of the weight thereof.

16. A solar fluid heater according to claim 12 or 13 wherein the reinforcing fabric bonded to each of said sheets is a woven fabric, and wherein each of said sheets with said woven fabric has a thickness of 3 mils and weighs about 4 ounces per square yard.

17. A solar fluid heater comprising a flexible-walled container with the walls thereof comprising opposing sheets of fluoroplastic material impermeable to vapor and fusibly bonded together so as to define a fluid flow passageway through the container, said flexible-walled container having an inlet and an outlet for a fluid to be heated to flow into and out of said container, and a reinforcing fabric embedded within each sheet of fluoroplastic material to lend strength and dimensional stability thereto.

18. A solar fluid heater according to claim 17 wherein said fluoroplastic material is polytetrafluoroethylene and said reinforcing fabric is formed of fibers selected from the group consistng of glass and aramid fibers.

19. A solar fluid heater according to claim 17 or 18 wherein each of the sheets of fluoroplastic material with a reinforcing fabric embedded therein has a thickness in the range of 3 mils to 20 mils.

20. A solar fluid heater according to claim 17 or 18 wherein each of the sheets of fluoroplastic material with a reinforcing fabric embedded therein has a thickness within a range of 3 mils to 6 mils and wherein the fluoroplastic material comprises about 60% of the weight thereof.

21. A solar fluid heater according to claim 17 or 18 wherein the reinforcing fabric embedded in each of said sheets is a woven fabric, and wherein each of said sheets with said woven fabric has a thickness of 3 mils and weighs about 4 ounces per square yard.

22. A solar fluid heater comprising a flexible-walled container with the walls thereof comprising opposing sheets of fluoroplastic material impermeable to vapor and fusibly bonded together so as to define a fluid flow passageway through the container, said flexible-walled container having an inlet and an outlet for a fluid to be heated to flow into and out of said container, a reinforcing fabric intimately bonded to each sheet of fluoroplastic material to lend strength and dimensional stability thereto, and wherein at least one of the opposing sheets of fluoroplastic material has the reinforcing fabric exposed exteriorly of the container, and wherein a relatively thin coating of heat absorbing material is positioned on the exposed reinforcing fabric to increase the solar heating of the container when the heat absorbing material is exposed to the sun.

23. A solar fluid heater according to claim 22 wherein said fluoroplastic material is polytetrafluoroethylene and said reinforcing fabric is formed of fibers selected from the group consisting of glass and aramid fibers.

* * * * *

UNITED STATES PATENT AND TRADEMARK OFFICE
CERTIFICATE OF CORRECTION

PATENT NO. : 4,476,855
DATED : October 16, 1984
INVENTOR(S) : Sherwood G. Benfield It is certified that error appears in the above-identified patent and that said Letters Patent are hereby corrected as shown below:

Column 6, Line 45, change "1" to --3--; Column 6, Line 60, change "1" to --3--.

Signed and Sealed this

Thirtieth Day of July 1985

[SEAL]

Attest:

DONALD J. QUIGG

*Attesting Officer*   *Acting Commissioner of Patents and Trademarks*